United States Patent
Sato

(10) Patent No.: US 6,909,525 B1
(45) Date of Patent: Jun. 21, 2005

(54) FACSIMILE MACHINE AND IMAGE MARGIN ADJUSTMENT METHOD

(75) Inventor: Junji Sato, Tokyo (JP)

(73) Assignee: Oki Data Corporation, Tokyo (JP)

( * ) Notice: Subject to any disclaimer, the term of this patent is extended or adjusted under 35 U.S.C. 154(b) by 608 days.

(21) Appl. No.: 09/587,904

(22) Filed: Jun. 6, 2000

(30) Foreign Application Priority Data

Jun. 18, 1999 (JP) .......................................... 11-171895

(51) Int. Cl.$^7$ ................................................ H04N 1/40
(52) U.S. Cl. ...................... 358/449; 358/443; 358/400; 358/434
(58) Field of Search ................................ 358/449, 400, 358/1.15, 434, 488, 426, 1.9, 2.99, 461, 443; 399/116; 341/170, 171, 172; 346/14 S

(56) References Cited

U.S. PATENT DOCUMENTS

| | | | | |
|---|---|---|---|---|
| 4,792,981 A | * | 12/1988 | Cahill et al. ................. | 382/235 |
| 4,876,609 A | * | 10/1989 | Ogura .......................... | 358/443 |
| 5,383,754 A | * | 1/1995 | Sumida et al. ................ | 412/11 |
| 6,298,156 B1 | * | 10/2001 | Ishida et al. ................ | 382/197 |
| 6,473,201 B1 | * | 10/2002 | Sato ........................... | 358/1.9 |

FOREIGN PATENT DOCUMENTS

JP  03039282 A  *  2/1991  ............ B41J/29/50

* cited by examiner

Primary Examiner—Mark Wallerson
Assistant Examiner—Heather D. Gibbs
(74) Attorney, Agent, or Firm—Rabin & Berdo, P.C.

(57) ABSTRACT

A facsimile machine detects transition points in image data, and adjusts the image data accordingly. Preferably, the image data are run-length data, from which image margins are detected, and the image data are adjusted to avoid overflow of printing margins. The adjustment may include horizontal repositioning and zooming. In zooming, an offset is preferably added to avoid moire patterns.

11 Claims, 8 Drawing Sheets

{3, 5, 7, 8, 9, 10, 12, 13, ⋯}
{3, 5, 8, 9, 10, 11, 13, 14, ⋯}
{3, 5, 7, 8, 9, 12, 14, 15, ⋯}
{3, 5, 8, 9, 10, 13, 15, 16, ⋯}

$r = 1.25 \quad \delta = 0.6, 0.2, 0.8, 0.4, \cdots$

{4, 7, 9, 10, 12, 13, 15, 17, ⋯}
{4, 6, 10, 11, 12, 14, 16, 17, ⋯}
{4, 7, 9, 11, 12, 16, 18, 19, ⋯}
{4, 6, 10, 11, 13, 16, 19, 20, ⋯}

FACSIMILE MACHINE AND IMAGE MARGIN ADJUSTMENT METHOD

BACKGROUND OF THE INVENTION

The present invention relates to a facsimile machine, more particularly to the adjustment of margins in image data in a facsimile machine.

To allow for skewed pages and other irregularities in paper transport, conventional facsimile machines leave predetermined blank left and right margins both in scanning and in printing documents. Conventional facsimile machines also allow the margins to be adjusted in a preset manner by the manufacturer or user. In addition, many conventional facsimile machines have a zoom function enabling received pages to be enlarged or reduced in size when printed.

One problem is that, since different margins may be set in different facsimile machines, the printing margins set at the receiving facsimile machine do not necessarily match the scanning margins set at the transmitting facsimile machine. If either the left or right printing margin is larger than the corresponding scanning margin, part of the scanned image of each page will overflow the printing margin and be lost when the page is printed.

A conventional solution to this problem is to reduce the width of each page slightly when it is printed, but this often causes pages to be reduced unnecessarily. This is undesirable, because the reduction process can create dropouts or otherwise degrade the quality of the printed page. If the page includes natural images such as photographs, the reduction process tends to produce annoying moire patterns.

SUMMARY OF THE INVENTION

An object of the present invention is to avoid both unnecessary overflow of printing margins and unnecessary reduction of image size in a facsimile machine.

Another object of the invention is to avoid moire patterns when an image is enlarged or reduced in a facsimile machine.

The invented facsimile machine includes a detection unit and an adjustment unit. The detection unit detects transition points in image data; the adjustment unit adjusts the image data according to the detected transition points. The image data are preferably run-length data, from which the detection unit detects margin positions.

The adjustment unit may adjust the image data so as to reposition the image horizontally, or so as to enlarge or reduce the width of the image. In the latter case, the adjustment unit preferably determines horizontal coordinates of transition points from the image data, modifies the coordinates by adding an offset, and multiplies the modified coordinates by a zoom ratio. The offset is preferably varied from scanning line to scanning line; alternatively, the offset may be varied randomly within areas in which transitions occur frequently.

Horizontal repositioning and width reduction avoid the overflow of printing margins.

A varying offset value suppresses moire patterns.

DETAILED DESCRIPTION OF THE INVENTION

Figure 1:
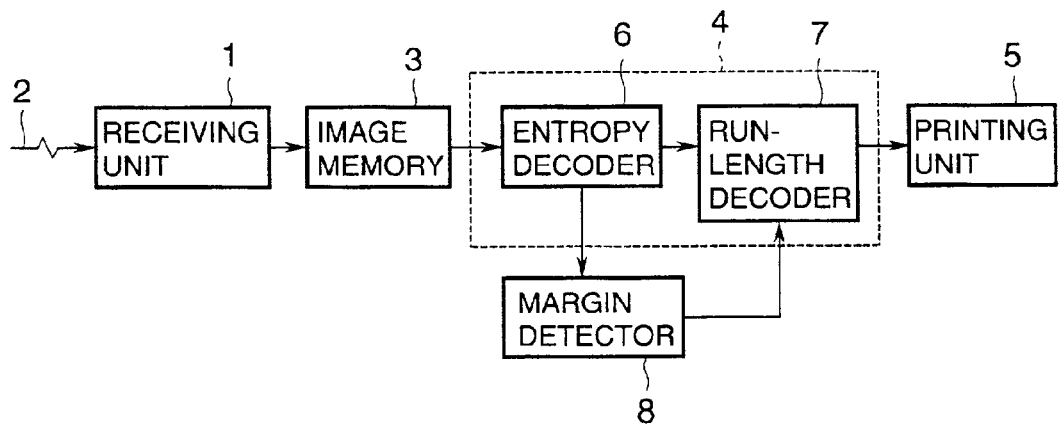
FIG. 1 is a block diagram of a facsimile machine embodying the present invention.

Embodiments of the invention will be described with reference to the attached drawings, in which like parts are indicated by like reference characters.

Referring to FIG. 1, the first embodiment is a facsimile machine comprising a receiving unit 1 coupled to a communication line 2, an image memory 3 coupled to the receiving unit 1, an image data decoding unit 4 coupled to the image memory 3, and a printing unit 5 coupled to the image data decoding unit 4. The image data decoding unit 4 comprises an entropy decoder 6 and a run-length decoder 7, and is coupled to a novel margin detector 8. The run-length decoder 7 also functions as an adjustment unit.

The facsimile machine in FIG. 1 receives and prints a transmitted document as follows.

The receiving unit 1 stores the document data, received from the communication line 2, in the image memory 3. The document data have been coded by run-length coding and entropy coding at the transmitting facsimile machine (not visible), and are stored in coded form. The entropy decoder 6 reads the coded document data from the image memory 3 and performs entropy decoding to obtain run-length data. The run-length data indicate the position of each black-to-white and white-to-black transition in each horizontal line of picture elements in the transmitted image. A horizontal line of picture elements will be referred to below as a scanning line, and the picture elements will also be referred to as dots. The entropy decoder 6 decodes the received data for the entire page, or for a predetermined number of scanning lines in the page, and supplies the decoded run-length data to the margin detector 8.

From the run-length data, the margin detector 8 determines the positions of the first transition from white to black and the last transition from black to white in each scanning line. From the positions of these transitions in the scanning lines supplied by the entropy decoder 6, the margin detector 8 detects the size of the left scanning margin (mSL) and the size of the right scanning margin (mSR) on the page. The margin detector 8 supplies these margin values to the run-length decoder 7.

The scanning margins are detected as, for example, the leftmost and rightmost positions of black picture elements on the page. The detected scanning margins do not necessarily correspond to the actual scanning margins used at the transmitting facsimile machine; the detected scanning margins may be larger, for example.

Figure 2:
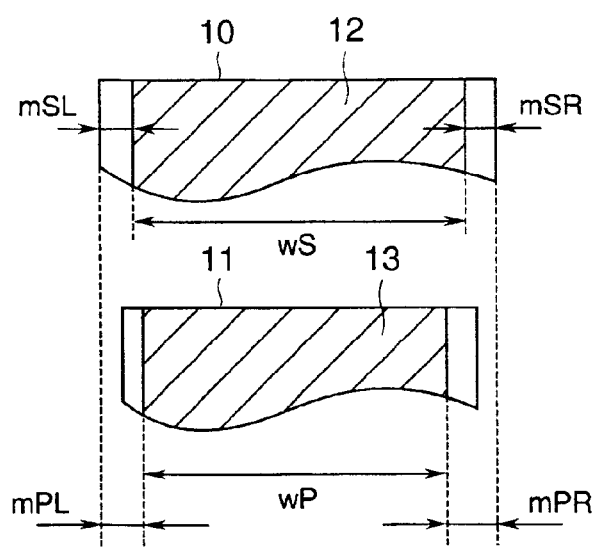
FIG. 2 illustrates scanning margins, printing margins, and page width.

The run-length decoder 7 compares the detected margins mSL, mSR with predetermined left and right printing margins mPL, mPR. As illustrated in FIG. 2, all four margins are expressed in relation to a predetermined paper width. In FIG. 2, this predetermined width is equal to the width of the original document 10, while the received document is printed on paper 11 having a smaller width. The symbol wS denotes the width of the valid area 12 between the scanning margins mSL, mSR of the transmitted document, while wP denotes the width of the printing area 13 on the page 11.

By comparing these margins, the run-length decoder 7 decides whether to adjust the position or size of the received image of the printed page. The decision algorithm is summarized in Table 1, in which aL is the difference between the left printing margin and the left detected scanning margin (mPL−mSL), and aR is the difference between the right printing margin and the right detected scanning margin (mPR−mSR).

TABLE 1

Adjustment Decision Algorithm

| Margin relationships | | | Decision |
|---|---|---|---|
| mPL ≦ mSL | mPR ≦ mSR | | No adjustment |
| | mPR > mSR | aR ≦ |aL| | Shift left by aR |
| | | aR > |aL| | Shift left by (aR + |aL|)/2 |
| mPL > mSL | mPR > mSR | | Reduce width |
| | mPR ≦ mSR | |aR| ≧ aL | Shift right by aL |
| | | |aR| < aL | Shift right by (aL + |aR|)/2 |

If the received page does not overflow either printing margin (mPL≦mSL and mPR≦mSR), the page is printed as received, with no size reduction or positional adjustment.

If the received page overflows the right printing margin (mPR>mSR) but does not overflow the left printing margin (mPL≦mSL), the page image is shifted to the left. If the amount of extra printing space available on the left (|aL|) equals or exceeds the amount of printing space deficient on the right (aR), the page is shifted left by the latter amount (aR), aligning the right detected scanning margin with the right printing margin, in which case the entire page can be printed. If aR exceeds |aL|, the page is shifted left by an amount halfway between |aL| and aR, thereby centering the page so that the unprintable area is equally distributed between the left and right margins.

If the page overflows the left printing margin but not the right printing margin (mPL>mSL and mPR≦mSR), the page image is shifted to the right in an analogous manner, either aligning the left detected scanning margin with the left printing margin, if this enables the entire page to be printed, or centering the document so that the unprintable area is equally distributed between the right and left margins.

If the received page overflows both printing margins (mPL>mSL, and mPR>mSR), as illustrated in FIG. 2, then the page is reduced in width. The reduction process will be explained in more detail below.

The entropy decoder 6 now reads the entire page again from the image memory 3, and supplies the decoded run-length data to the run-length decoder 7. If necessary, the run-length decoder 7 adjusts the run-length data, or coordinate data derived from the run-length data, as follows.

To shift the page image rightward or leftward, the run-length decoder 7 increases or decreases the first run-length value in each scanning line. Other run-length values need not be altered, so this adjustment can be carried out quickly, with minimal computation.

If reduction is necessary, the reduction ratio r is set equal to wP/wS, and the reduction operation is performed by adjusting the coordinates of the transitions, which the run-length decoder 7 easily obtains by successively adding the run-length values in each scanning line. If $a_0$ is the coordinate of the first transition from white to black in a scanning line, and $a_1$ is the coordinate of the following transition from black to white, the run-length decoder 7 converts these coordinates to two new transition coordinates by the following formulas, in which m'PL is the left printing margin with respect to the actual edge of the paper.

$$a_0 \rightarrow \{(a_0 - mSL) \times r + m'PL\}$$

$$a_1 \rightarrow \{(a_1 - mSL) \times r + m'PL\}$$

This conversion aligns both the right and left margins of the adjusted page image with the right and left printing margins.

After adjusting each line of run-length data or transition coordinates, the run-length decoder 7 converts the adjusted data or coordinates to bit-mapped data, in which each bit represents one picture element or dot. The printing unit 5 prints the bit-mapped data. The run-length decoder 7 can send the bit-mapped data to the printing unit 5 line by line, and does not necessarily have to prepare an entire page of bit-mapped data in advance.

As described above, when a received page overflows just one of the two horizontal printing margins, the first embodiment repositions the page image horizontally without reducing its size. Reduction is employed only when the page image overflows both printing margins. Accordingly, reduction is never employed unnecessarily.

By detecting margins and determining the necessary repositioning adjustments and size reductions from the run-length data, before each page is converted to bit-mapped data, the first embodiment avoids the need to store an entire page of bit-mapped data in memory, and the need to adjust the position or size of a page that has already been converted to bit-mapped data. This adjustment would slow the printing process because it would require considerable shifting and rewriting of bits; by avoiding these bit manipulations, the first embodiment facilitates high-speed operation, as well as conserving memory space.

In a variation of the first embodiment, when a page overflows just one of the two printing margins, and the overflow exceeds the amount of extra space available at the other printing margin (aR>|aL| or |aR|<aL in Table 1), instead of being shifted by (aR+|aL|)/2 or (aL+|aR|)/2, the page image is reduced in width by the formulas given above, so that it exactly fits between the printing margins. This variation ensures that no part of the page image will be lost.

In another variation of the first embodiment, when the width wS of the received page is less than the printing page width wP, the page image is enlarged in width by a factor r equal to wP/wS before being printed, so that the document page exactly fits between the printing margins. The enlargement operation is carried out using the same formulas as for the reduction operation, given above.

Next, a second embodiment will be described. The second embodiment modifies the reduction and enlargement operations carried out in the first embodiment and its variations. Reduction and enlargement will be referred to collectively as zoom operations or zooming.

As in the first embodiment, zooming is carried out on the run-length data, by multiplying the coordinates of the transition points by a zoom ratio r. This multiplication operation may be preceded by subtraction of the left scanning margin mSL, and followed by addition of the left printing margin m'PL, as described in the first embodiment, but these steps of adding and subtracting margin values will be omitted, in order to simplify the description of the second embodiment.

Figure 3:
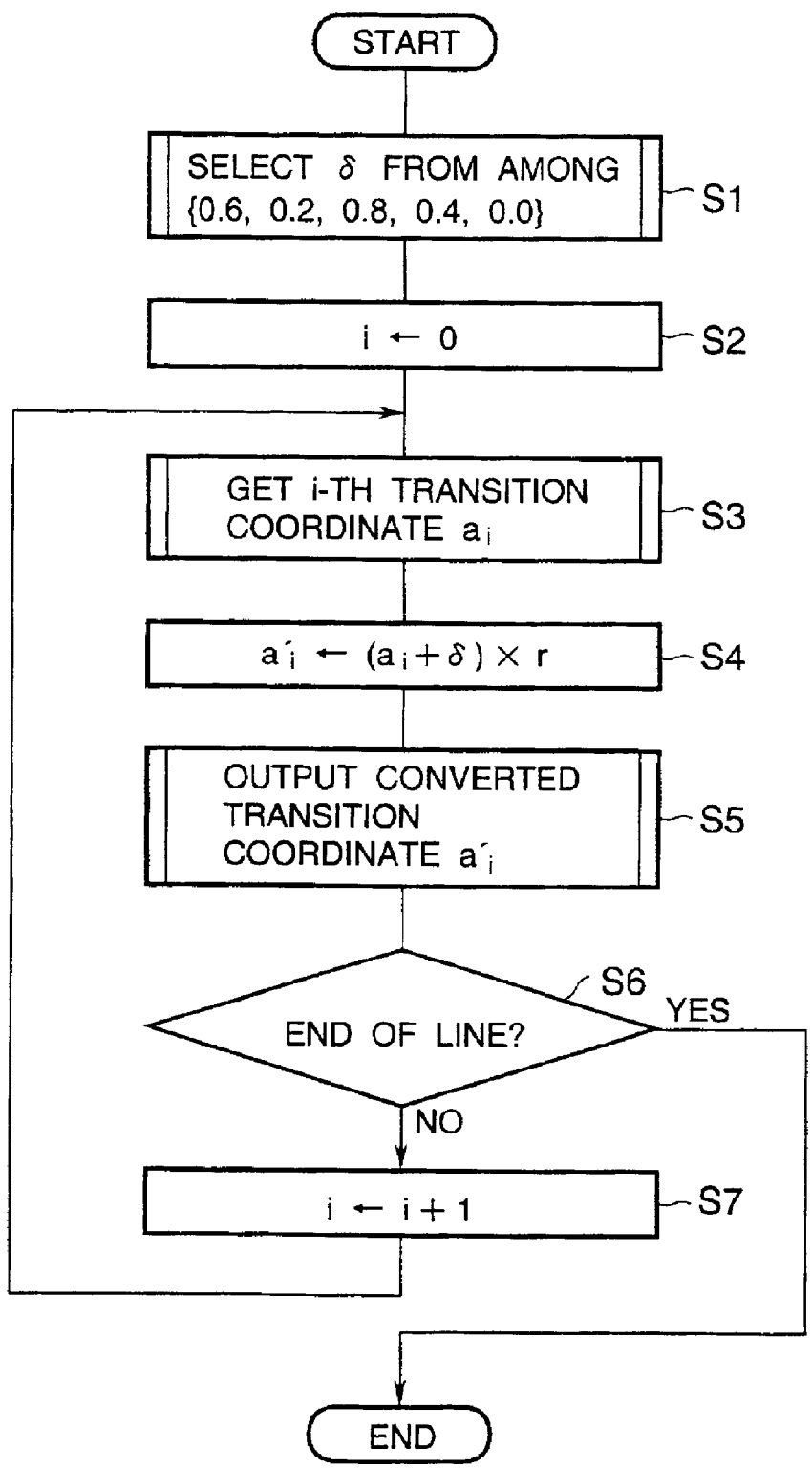
FIG. 3 is a flowchart illustrating an enlargement method embodying the present invention.

When the zoom ratio is greater than unity, the zoom operation is an enlargement operation, and is performed in each scanning line according to the procedure in FIG. 3.

The first step (S1) is to select an offset δ from the sequence of values {0.6, 0.2, 0.8, 0.4, 0}. These five offset values are used cyclically, the value changing with each new scanning line.

Next, a counting variable i is initialized to zero (step S2).

The following steps form a loop that is repeated until the end of the scanning line is reached. The coordinate $a_i$ of the i-th transition point in the scanning line is obtained from the run-length data (step S3). This coordinate is then converted to a new coordinate $a'_i$ by adding δ, multiplying by the zoom ratio r, and discarding any fractions in the result (step S4). The converted integer value $a'_i$ is output as the new coordinate of the i-th transition point (step S5). If this is not the last transition point in the scanning line (step S6), the counting variable i is incremented (step S7) and the loop is repeated from step S3 to convert the next transition point.

Figure 4A:
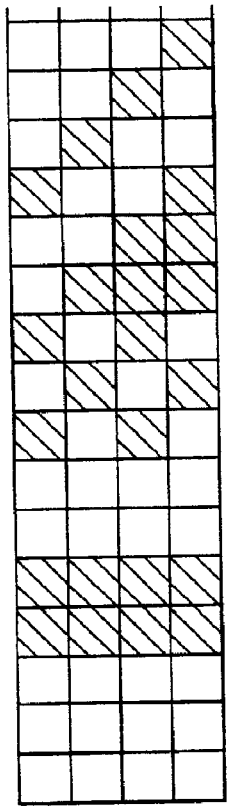
FIG. 4A illustrates part of a dot pattern on a page.
Figure 4B:
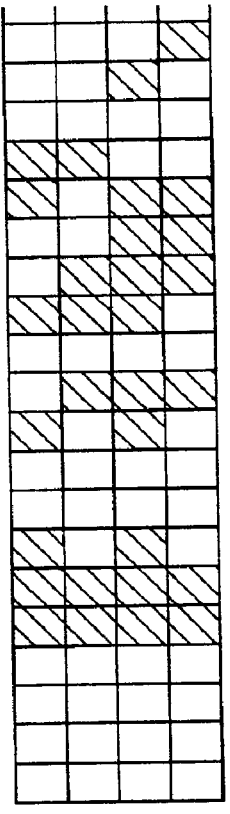
FIG. 4B illustrates the pattern in FIG. 4A enlarged by the method of FIG. 3.
Figure 4C:
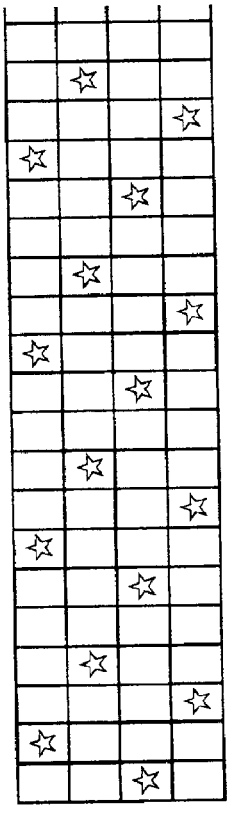
FIG. 4C illustrates positions at which picture elements have been inserted in FIG. 4B.

To illustrate this procedure, FIG. 4A shows an example of the top left part of a received page image that will be enlarged with a zoom ratio r of 1.25. Using an offset value δ of 0.6, the procedure in FIG. 3 converts the transition coordinates {3, 5, 7, 8, 9, 10, 12, 13, . . . } in the first line in FIG. 4A to {4, 7, 9, 10, 12, 13, 15, 17, . . . }, as illustrated in FIG. 4B. The other scanning lines are converted similarly, with δ equal to 0.2 in the second line, 0.8 in the third line, and 0.4 in the fourth line. The effect of this conversion is to insert new picture elements at the points marked by stars in FIG. 4C, each new picture element having the same value as the picture element immediately to its left.

Figure 5:
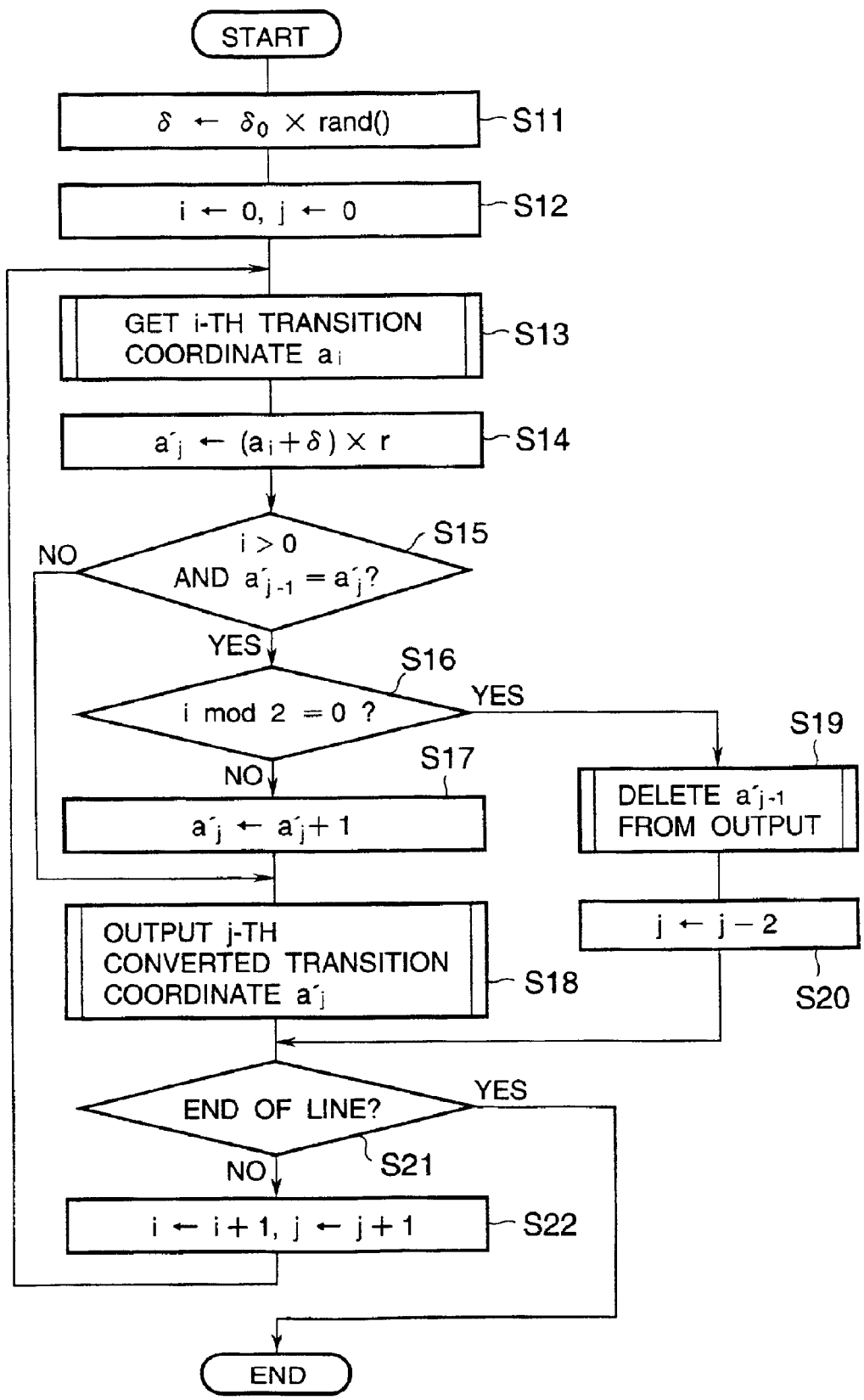
FIG. 5 is a flowchart illustrating a reduction method embodying the present invention.

When the zoom ratio is less than unity, the zoom operation is a reduction operation, and is carried out in each scanning line according to the procedure in FIG. 5.

In the first step (S11), an offset value δ is obtained by multiplying a base value $δ_0$ by a random number rand( ). The base value $δ_0$ is, for example, equal to unity ($δ_{0=1.0}$). The rand number rand( ) has an arbitrary value equal to or greater than zero but less than one (0≦rand( )<1). Random numbers can be generated by any of various well-known methods. In general, rand( ) and hence δ will vary unpredictably from line to line.

Next, an input counting variable i and an output counting variable J are initialized to zero (step S12).

The following steps form a loop that is repeated until all transition coordinates in the scanning line have been converted. The conversion process is basically the same as when the zoom ratio is greater than unity, but includes additional processing to deal with cases in which, due to the discarding of fractions, two consecutive transition coordinates are converted to the same coordinate. If the two consecutive transitions are a black-to-white transition (i odd) followed by a white-to-black transition (i even), the two identical converted coordinates are eliminated, allowing an isolated white dot to disappear. If the two consecutive transitions are a white-to-black transition (i even) followed by a black-to-white transition (i odd), the second converted transition coordinate is incremented so that the isolated black dot does not disappear.

The details of this process are as follows. Whether i is even or odd is determined from the remainder (i mod 2) when i is divided by two.

The i-th transition coordinate $a_i$ is obtained from the run-length data (step S13) and converted to a new coordinate $a'_j$ by adding the offset value δ, multiplying by the zoom ratio r, and discarding fractions (step S14). If i is greater than zero and $a'_j$ is equal to $a'_{j-1}$, (step S15), and if i is odd (step S16), then $a'_j$ is incremented by one (step S17), and the incremented value is output as the j-th transition coordinate in the reduced line (step S18), thereby preserving an isolated black dot.

If i is equal to zero in step S15, or if i is greater than zero but $a'_j$ is not equal to $a'_{j-1}$, then $a'_j$ is output (step S18) without being incremented.

If i is greater than zero and $a'_j$ is equal to $a'_{j-1}$ in step S15, and if i is even in step S16, then $a'_{j-1}$, is deleted from the series of output coordinates (step S19), $a'_j$ is not output, and the output counting variable j is decremented by two (step S20), thereby deleting an isolated white dot.

After step S18 or S20, if the end of the scanning line has not been reached (step S21), the counting variables i and j are both incremented (step S22) and the loop is repeated from step S13.

Figures 6A, 6B, 6C:
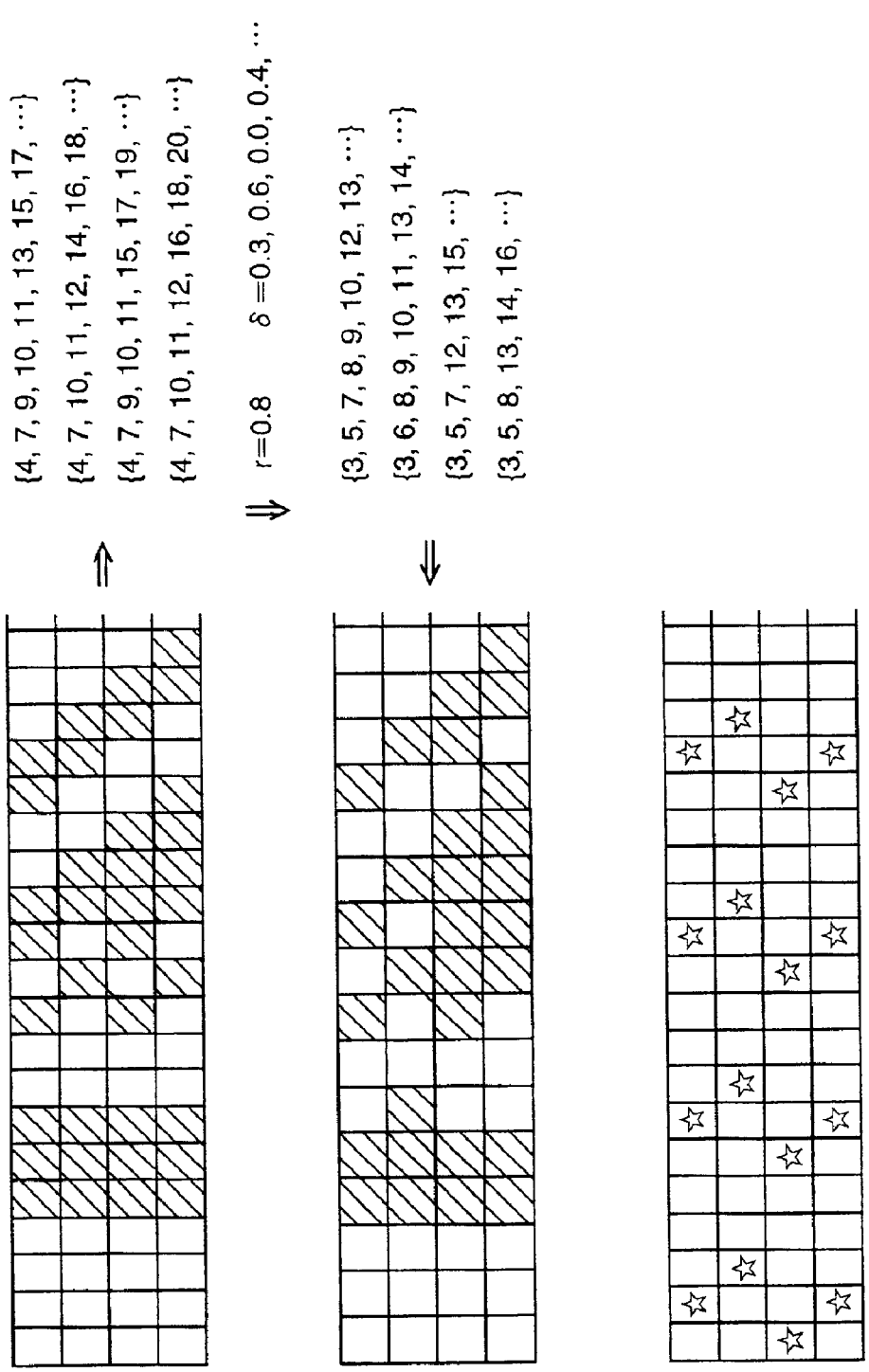
FIG. 6A illustrates part of a dot pattern on a page.
FIG. 6B illustrates the pattern in FIG. 6A reduced by the method of FIG. 5.
FIG. 6C illustrates positions at which picture elements have been deleted in FIG. 6A.

FIG. 6A shows an example of the top left part of a page in which the first scanning line has transition coordinates {4, 7, 9, 10, 11, 13, 15, 17, . . . }. If the zoom ratio r is 0.8 and the offset value δ is 0.3, the converted transition coordinates are {3, 5, 7, 8, 9, 10, 12, 13, . . . }, as illustrated in FIG. 6B. The other illustrated lines of converted coordinates are obtained with offset values of 0.6, 0.0, and 0.4, respectively. The effect of the conversion is to delete picture elements at the points marked by stars in FIG. 6C.

Figure 7C:
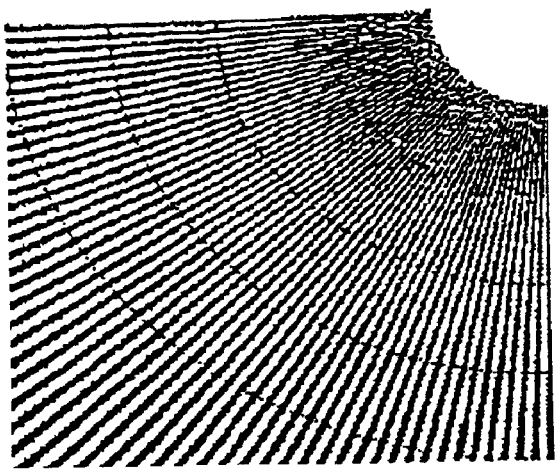
FIG. 7C shows the test pattern reduced by the method of FIG. 5.
Figure 7B:
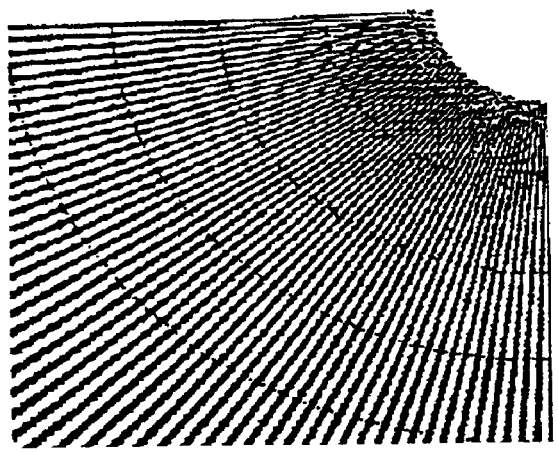
FIG. 7B shows the test pattern reduced by a conventional method.
Figure 7A:
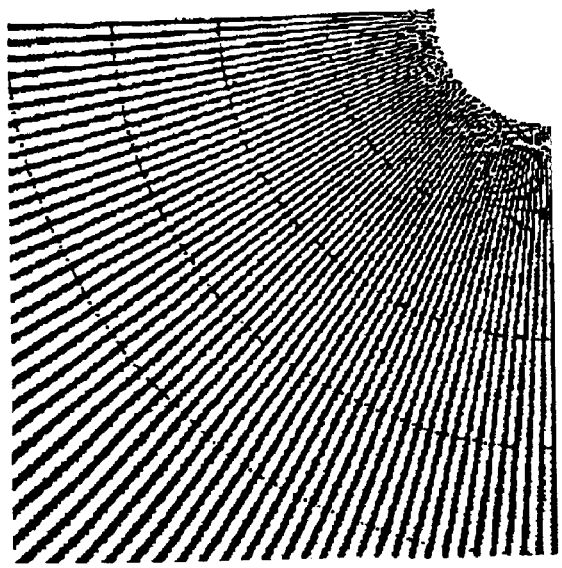
FIG. 7A shows a test pattern.

By changing the offset value δ from line to line, the second embodiment suppresses moire patterns that might otherwise form. FIG. 7A shows a test pattern of the type that generates moire patterns. FIG. 7B shows the test pattern reduced by the method of the first embodiment. FIG. 7C shows the test pattern reduced by the method of the second embodiment. Moire patterns are less visible in FIG. 7C than in FIG. 7B. Particularly when a received facsimile page includes a photograph or other natural image, the third embodiment improves the quality of the printed output.

Next, a third embodiment will be described. The third embodiment uses either the variable offset value of the second embodiment or a fixed offset value, depending on the frequency with which transitions occur.

Natural images, and other images that generate moire patterns when zoomed, usually have more black-white transitions per scanning line than do text and line drawings, which do not generate moire patterns. Accordingly, when zooming a page, the run-length decoder 7 in the third embodiment counts the number n of transitions in each scanning line and compares this number n with a predetermined threshold N. If n is less than N, the scanning line is assumed to belong to a text or line-art part of the page, and is zoomed with a fixed offset value. If n is equal to or greater than N, the scanning line is assumed to be part of a natural image, and is zoomed with a randomized offset value.

Figure 8:
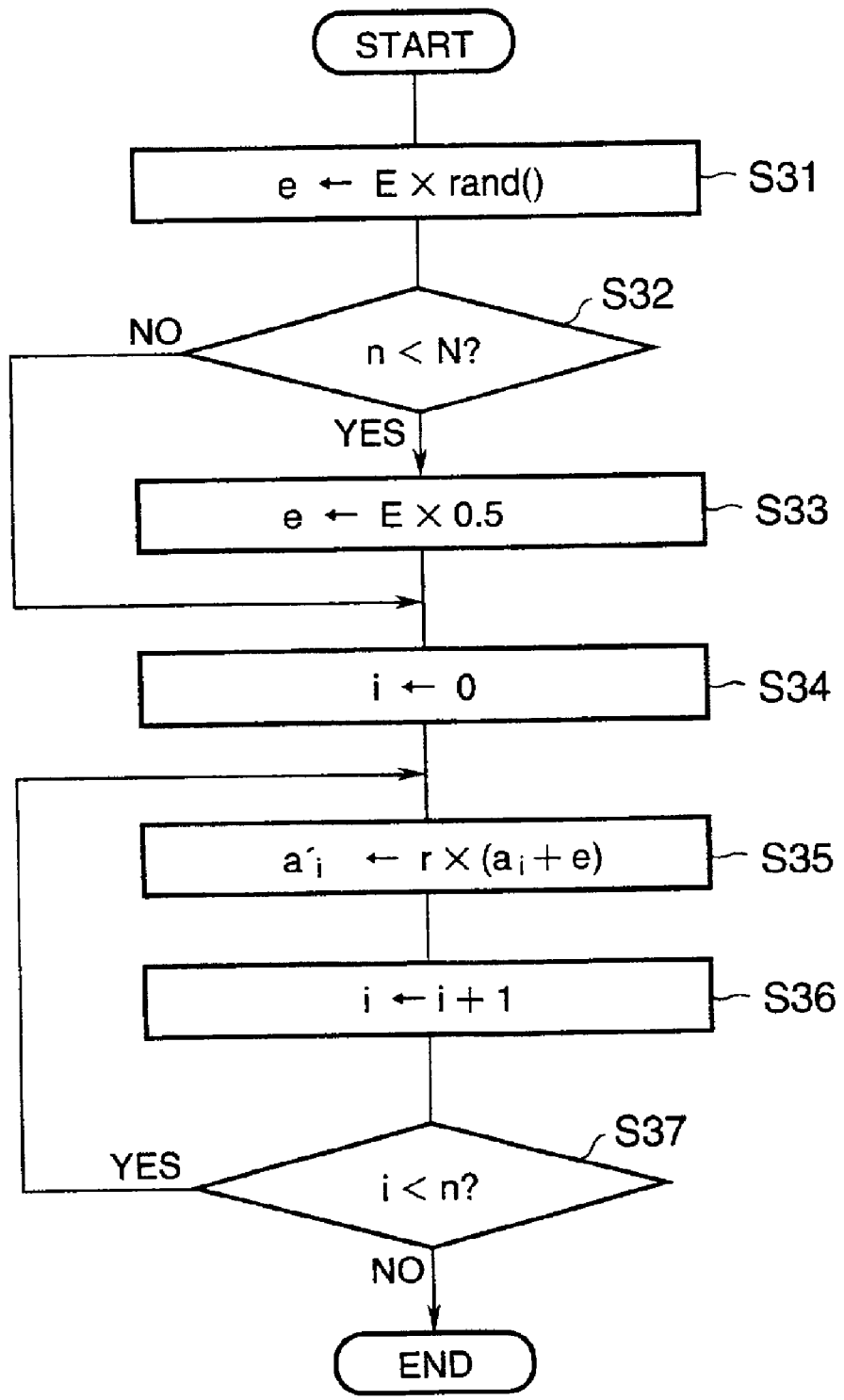
FIG. 8 is a flowchart illustrating another enlargement and reduction method embodying the present invention.

For each scanning line, the procedure shown in FIG. 8 is followed. First, a random offset value e is calculated by multiplying a random number rand( ) by a fixed variance coefficient E (step S31). The random number rand( ) is between zero and one (0≦rand( )<1). The number of transitions n in the line is compared with the threshold N (step S32). If there are fewer than N transitions in the line, the offset value e is changed to one-half the value of E (step S33); otherwise, the randomized value of e generated in step S31 is used. Next, a counting variable i is initialized to zero (step S34).

In the following loop, each transition coordinate ai in the scanning line is converted by adding the offset value e and multiplying by the zoom ratio r (step S35), the counting variable i is incremented (step S36), and these steps are repeated until i reaches the number n of transitions in the line (step S37).

In natural images, the third embodiment produces substantially the same effect as the second embodiment, improving the quality of enlarged or reduced pages by suppressing moire patterns.

In text and line art, the third embodiment avoids jagged edges and other artifacts that might result from the use of a randomized offset value, thereby preserving the sharpness and legibility of the printed image.

If text/line-art areas and natural-image areas are laid out one above another on the same page, the third embodiment identifies each area and uses the appropriate type of offset.

In a variation of the third embodiment, natural images and text placed side-by-side are also distinguished. This is done by comparing the length of D consecutive runs with a threshold P, where D and P are predetermined positive integers. The length of D consecutive runs is generally shorter in natural-image areas than in text or line-art areas, because transitions occur more frequently. Accordingly, the i-th transition coordinate $a_i$ is considered to belong to a natural image area if the length of D consecutive runs beginning at the i-th transition ($a_{i+D}-a_i$) is less than P. Otherwise, the i-th transition $a_i$ is considered to belong to a text/line-art area. The last D transitions are considered by default to belong to text/line-art areas.

Figure 9:
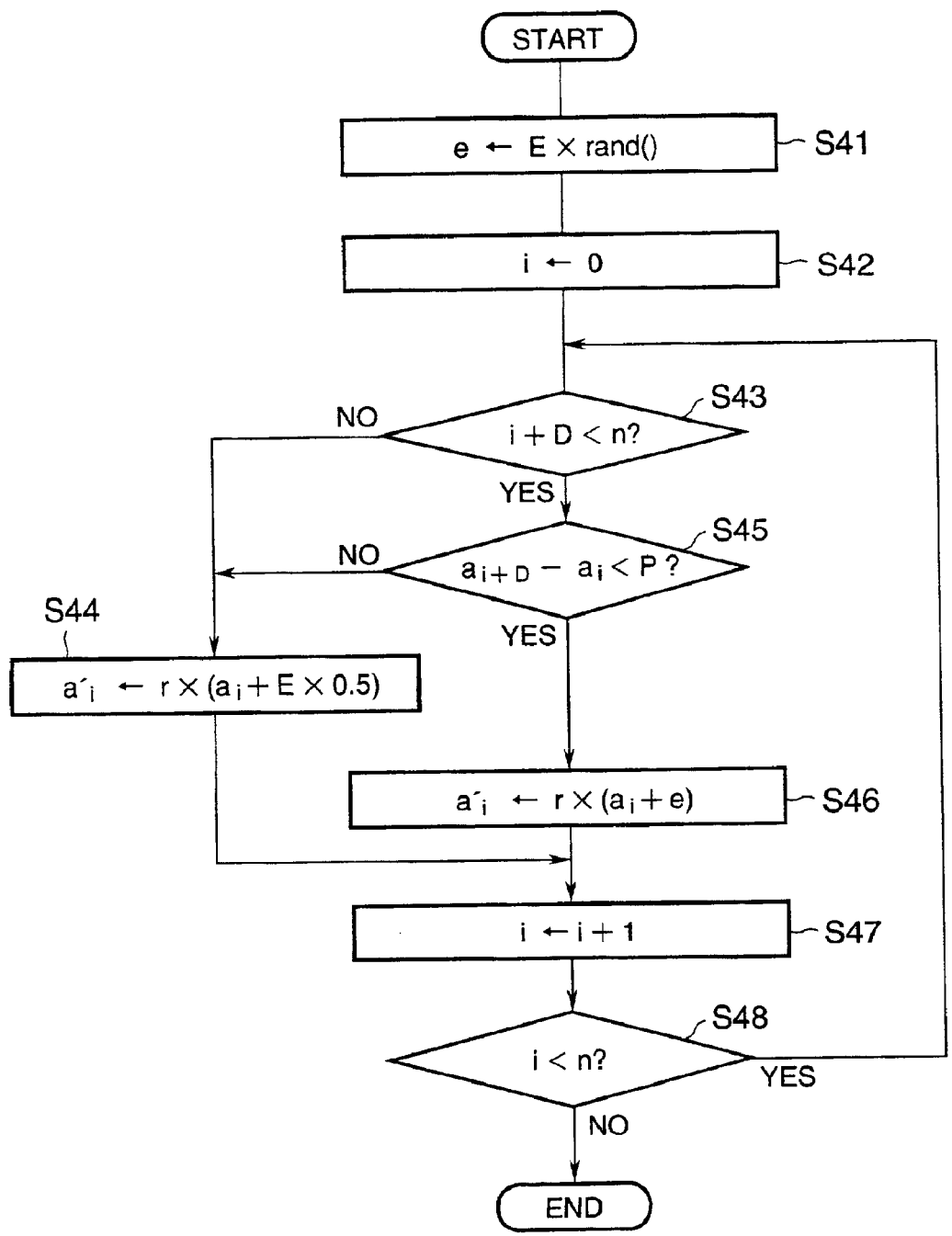
FIG. 9 is a flowchart illustrating a variation of the method in FIG. 8.

Referring to FIG. 9, after the offset value e has been set to a random value (step S41) and the counting variable i has been initialized to zero (step S42), the following loop is executed. First, i+D is compared with n to decide whether there are at least D transitions left in the line (step S43). If there are not, the i-th transition coordinate $a_i$ is converted by adding a fixed offset (E×0.5) and multiplying by the zoom ratio r (step S44). If there are at least D transitions left, the difference between the (i+D)-th transition coordinate ($a_{i+D}$) and the i-th coordinate ($a_i$) is compared with P (step S45). If the difference is less than P, then $a_i$ is converted by adding the randomized offset value e and multiplying by the zoom ratio r (step S46); otherwise, $a_i$ is converted using the fixed offset in step S44. After step S44 or S46, the counting variable i is incremented (step S47), and if the incremented value is less than n (step S48), the loop is repeated from step S43.

This variation of the third embodiment distinguishes between natural-image areas and text/line-art areas regardless of how the areas are laid out, and suppresses zoom-induced moire patterns in natural-image areas by using a randomized offset, while maintaining good legibility in text and line-art areas by using a fixed offset.

In another variation of the third embodiment, a procedure similar to the procedure described in the second embodiment is followed to avoid eliminating isolated black dots when the zoom ratio is less than unity.

The procedures in the second and third embodiments are not limited to the conversion of received images; they can also be used to enlarge or reduce the width of images that will be transmitted to another facsimile machine, to match the image size to the capabilities of the other facsimile machine.

Those skilled in the art will recognize that further variations are possible within the scope claimed below.

What is claimed is:

1. A facsimile machine, comprising:
   a detection unit detecting transition points in a width direction in image data representing an image of a page having a width greater than a printing width of the facsimile machine, the image data including blank areas at right and left edges of the image of the page in the width direction; and
   an adjustment unit coupled to the detection unit, having means for deciding whether the image data will be adjusted on the basis of the detected transition points;
   wherein the adjustment unit has means for adjusting the image data by zooming the image data, the adjustment unit zooming the image data by adding an offset to horizontal coordinates of said transition points, then multiplying by a zoom ratio, the horizontal coordinates being measured in the width direction.

2. The facsimile machine of claim 1, wherein the image data is comprised of horizontal scanning lines and the adjustment unit changes said offset once per horizontal scanning line.

3. The facsimile machine of claim 1, wherein the adjustment unit assigns a random value to said offset.

4. The facsimile machine of claim 1, wherein the adjustment unit assigns a fixed value to said offset in areas with comparatively few said transition points, and assigns a random value to said offset in areas with comparatively many said transition points.

5. The facsimile machine of claim 4, wherein the adjustment unit distinguishes between said areas with comparatively few said transition points and said areas with comparatively many said transition points within each said horizontal scanning line.

6. A method of processing image data, representing an image of a page, in preparation for printing of the image data by a facsimile machine having set printing margins and a printing width less than a width of the page image, the image data including blank areas at right and left edges of the image of the page in a width direction of the page image, the method comprising the steps of:
   (a) detecting the blank areas in the width direction in the image of said page from the image data;
   (b) comparing the detected blank areas with the printing margins in the width direction of the facsimile machine; and
   (c) modifying the image data according to differences between the detected blank areas and the printing margins;
   wherein said step (c) comprises zooming the image of said page, and said step (c) further comprises the steps of:
   (d) determining horizontal coordinates, measured in the width direction, of transitions between different picture-element values in the image of said page;
   (e) modifying said horizontal coordinates by adding an offset; and
   (f) multiplying the modified horizontal coordinates by a zoom ratio.

7. The method of claim 6, said step (c) further comprises the step of:
   (g) changing said offset once per horizontal line of picture elements in the image of said page.

8. The method of claim 6, wherein said step (c) further comprises the steps of:

(h) distinguishing between first areas, in which said transitions occur comparatively frequently, and second areas, in which said transitions occur comparatively infrequently, in the image of said page;

(i) assigning a randomly varying value to said offset in said first areas; and (j) assigning a fixed value to said offset in said second areas.

9. The method of claim 8, wherein said step (h) includes counting said transitions in each horizontal line of picture elements in the image of said page, said offset having a single value in each said horizontal line.

10. The method of claim 8, wherein said step (h) includes comparing distances between said transitions with a predetermined threshold, thereby enabling said offset to vary within each horizontal line of picture elements in the image of said page.

11. A method of processing image data representing an image of a page, in preparation for printing of the image data by a facsimile machine having set printing margins and a printing width less than a width of the page image, the image data including blank areas at right and left edges of the image of the page in a width direction of the page image, the method comprising the steps of:

(a) detecting the blank areas in the width direction in the image of said page from the image data;

(b) comparing the detected blank areas with the printing margins in the width direction of the facsimile machine; and (c) modifying the image data according to differences between the detected blank areas and the printing margins;

wherein the detected margins include a left detected margin and a right detected margin, the printing margins include a left printing margin and a right printing margin, and step (c) further includes the steps of:

(k) reducing the image of said page in width, by zooming the image horizontally, if the left printing margin exceeds the left detected margin and the right printing margin exceeds the right detected margin;

(l) shifting the image of said page rightward if the left printing margin exceeds the left detected margin and the right printing margin does not exceed the right detected margin; and (m) shifting the image of said page leftward if the right printing margin exceeds the right detected margin and the left printing margin does not exceed the left detected margin.

\* \* \* \* \*